United States Patent Office 3,054,341
Patented Sept. 18, 1962

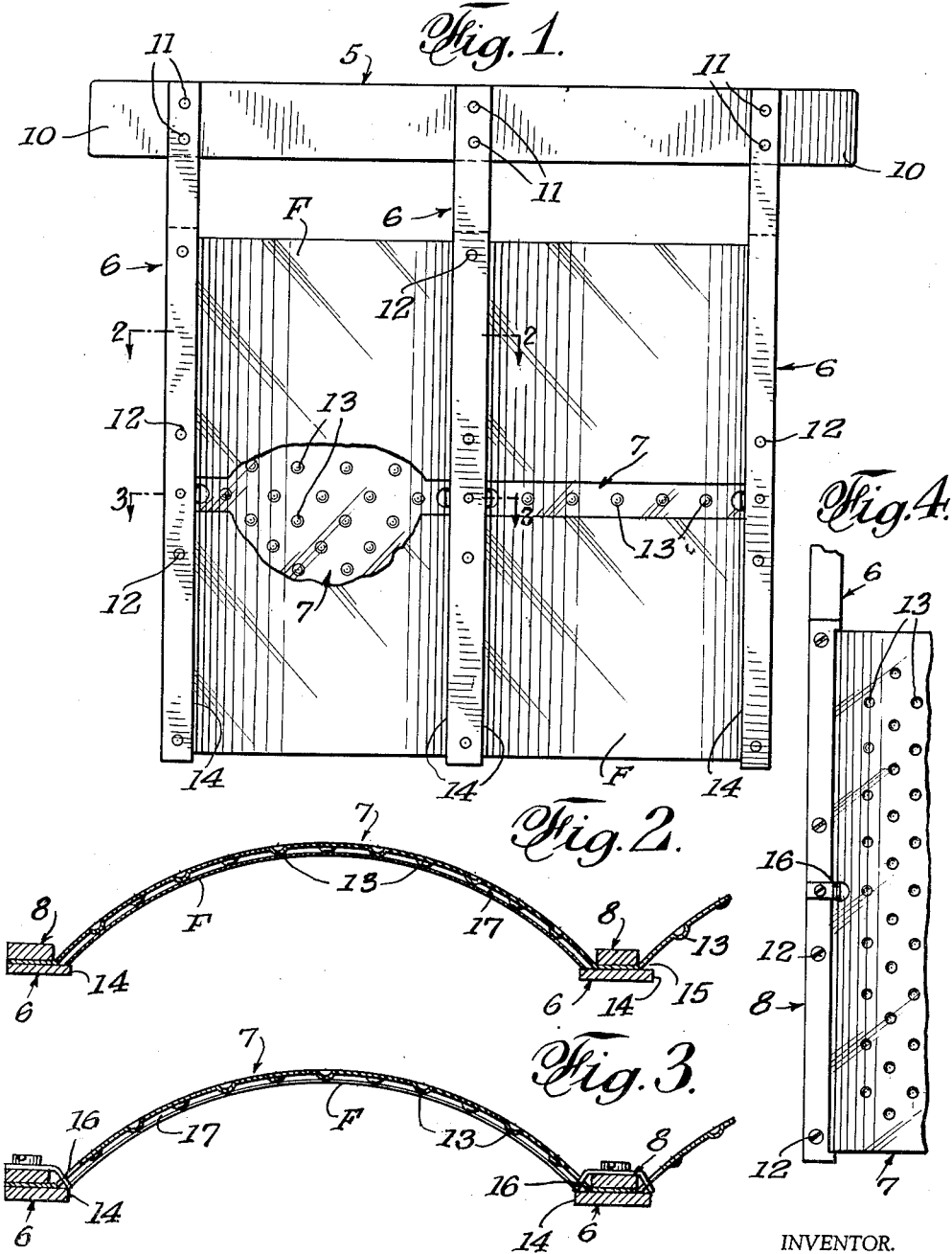

3,054,341
FILM HOLDER
John R. Wolber, Los Angeles, Calif., assignor to Westrip Laboratories, Inc., San Fernando, Calif., a corporation of California
Filed Aug. 29, 1960, Ser. No. 52,448
6 Claims. (Cl. 95—100)

This invention relates to a film holder, especially for hanging film in a processing bath, particularly color film.

Film-processing baths are usually rendered turbulent, usually by use of nitrogen gas. The bubbling effect of such or similar gases avoids streaking and mottling of the film being processed because the agitated bath fluid evenly acts on the emulsions on the film. Film placed in such a turbulent bath in the ordinary unsupported manner would wash away from its given position or, at least, move around to such a degree as to contact adjacent film. The result is that some or all of the sections of film in a bath will become scratched or otherwise marred because edge-to-face contact under such conditions, is quite frequent.

An object of the present invention is to provide a film holder that supports the film non-movably while subject to bubbling turbulences in a processing bath, and has minimum obstruction to the path of movement of the bubbles in the bath liquid to, thereby, insure maximum and efficient processing.

Another object of the invention is to provide a film holder, as above characterized, that holds the film in a transversely curved and, therefore, stable condition to resist undue film movement under bath turbulences.

A further object of the invention is to provide a film holder in which the transversely curved form of the film is simply achieved by contact of the opposite side edges of the film, the two other edges being unsupported and without framing.

This invention also has for its objects to provide such means that are positive in operation, convenient in use, easily installed in a working position and easily disconnected therefrom, economical of manufacture, relatively simple, and of general superiority and serviceability.

The invention also compares novel details of construction and novel combinations and arrangements of parts, which will more fully appear in the course of the following description, and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a front elevational view of a film holder according to the present invention.

FIGS. 2 and 3 are enlarged cross-sectional views as taken on the respective lines 2—2 and 3—3 of FIG. 1.

FIG. 4 is a fragmentary rear view of the holder.

The present holder is devised to hold rectangular sheets of film F that have emulsion coating on both faces, one being the emulsion that is being processed in the bath, and the other, an emulsion that is provided primarily to counteract any tendency for the film to "ball up" or curl excessively. The present holder holds the film with the first side outward so that the same is in full, unobstructed contact with the bath liquid.

The film holder that is illustrated comprises, generally, a transverse member 5, a plurality of transversely spaced longitudinal members 6 extending in the same direction from the member 5, transversely curved backing members 7 extending between adjacent members 6, and a strip member 8 affixed to each member 6 to affix the backing members in place and to cooperate with the latter members to engage the opposite side edges of sheets of film F placed against the concave faces of the backing members to retain position thereagainst.

The above generally described holder constitutes a frame that holds sheet film in fixedly operative position for efficient processing by the liquid of a bath, in which such film is mounted and removed with easy facility, and which obviates damage by scratching or other abrasion.

The member 5 comprises a bar of rigid material of such length that the ends 10 thereof extend laterally from the two outer members 6. Said ends 10, by engaging a cross bar or the opposite edges of a tank, comprise means for suspending the holder with the film carried thereby immersed in the bath liquid.

While three members 6 are shown, two, four or more may be used depending on the capacity of the holder desired. Each member 6, of rigid material, is affixed by one end to member 5, as by units or screws 11. The members 6 are preferably parallel, as shown and are transversely spaced apart a distance somewhat less than the transverse dimension of the film to be handled by the holder.

The backing members 7 are advantageously made of thin transparent plastic material of elastic, rather than limp, consistency, the same extending between adjacent members 6 and affixed thereto, as by screws 12, as best seen in FIGS. 2 and 3. Said backing members are transversely bowed in a direction away from where their edges are connected to members 6 and are provided with a multiplicity of dimples, embossments and the like 13 that extend from the concave faces of said backing members. Thus, held, the members 7 are quite rigid.

The strip members 6, also of rigid material, clamp the side edges of the backing members against the members 6 and are held in place by the mentioned screws 12.

In the above-described frame structure, the edges 14 of the members 6 extend inwardly of the side edges of the backing members to form longitudinal recesses or seats 15 that are adapted to catch the side edges of sheets of film F placed, as best seen in FIG. 2, in transversely curved engagement with the embossments 13 of the backing. The film may easily be snapped into place by placing both side edges thereof into said seats 15 and then, because of the flexibility of the film, forcing the same into transversely curved engagement with the embossments 13.

Of course, the sheets of film are proportioned, in at least one dimension, to fit, as described, between adjacent members 6 and, if desired, endwise locating elements 16 may be provided to guide the insertion of film sheets into the holder.

It will be seen from the foregoing, that sheets of film F are so held in the holder that bubbling or agitated processing liquid is free to circulate around both sides of the film because the embossments create a circulating passage 17 between each film and its backing member 7. Also, since the latter members are transparent, processing time, particularly developing, is shortened. Further, the films F are fixedly held and cannot move under forces created in a bubbling or agitated liquid.

Screens, perforated sheets or similar backing means may be substituted for the embossed members shown.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A film holder comprising two spaced longitudinal members, and a thin, elastic, transversely curved and transparent backing member spanning between the longitudinal members, said backing member including means to provide liquid-circulating space around the surface of a sheet of film disposed in contact with said backing member and providing free openings adjacent the top and bottom edges of the film to be disposed therein.

2. A film holder comprising two spaced longitudinal members, a thin, elastic, transversely curved and transparent backing member spanning between the longitudinal members, the longitudinal members having opposed longitudinal edges that define opposed longitudinal recesses to receive the opposite edges of a sheet of film and to hold said sheet transversely bowed against the backing member, and means on the latter member providing free openings adjacent the top and bottom edges of said backing member, thus providing liquid-circulating space around the entire surface of the sheet of film that is in contact with said means.

3. A film holder according to claim 2 in which the last-mentioned means comprises embossments on the backing member that contact the mentioned surface of the film and space the latter from the backing member.

4. A film holder comprising two spaced longitudinal members, a transverse hanger member connecting the ends of the longitudinal members, and a thin, elastic, transversely curved and transparent backing member spanning between the longitudinal members, said backing member including means to provide liquid-circulating space around the entire surface of a sheet of film disposed in contact with said backing member.

5. In a film holder, a pair of transversely spaced longitudinal members spaced closer together than a sheet of film to span therebetween, said members having opposite longitudinal recesses to receive the side edges of such a sheet of film and hold the same transversely bowed between the members, a backing member in spaced relation to the convex face of a film so positioned, said backing member being transparent and provided with a multiplicity of embossments to space the sheet of film therefrom and to provide free top and bottom openings between the film and backing member thereby permitting free circulation of processing solutions over the entire surface of the film to be positioned therein.

6. A film holder comprising two spaced longitudinal members, a transversely curved backing member spanning between the longitudinal members, the longitudinal members having opposed longitudinal edges that define opposed longitudinal recesses to receive the opposite edges of a sheet of film and to hold said sheet transversely bowed against the backing member, and means on the latter member providing free openings adjacent the top and bottom edges of said backing member, thus providing liquid-circulating space around the surface of the entire sheet of film that is in contact with said means, the last-mentioned means comprising embossments on the backing member that contact the mentioned surface of the film and space the latter from the backing member, and the backing member being transparent.

References Cited in the file of this patent

UNITED STATES PATENTS

| | | |
|---|---|---|
| 1,194,321 | Randall | Aug. 8, 1916 |
| 1,859,131 | Depperman | May 17, 1932 |
| 3,005,396 | Keller | Oct. 24, 1961 |

FOREIGN PATENTS

| | | |
|---|---|---|
| 23,973 | Great Britain | 1907 |
| 12,804 | Great Britain | 1912 |
| 524,251 | France | May 10, 1921 |
| 405,552 | Germany | Nov. 6, 1924 |